United States Patent [19]

McGovern

[11] Patent Number: 5,580,603
[45] Date of Patent: Dec. 3, 1996

[54] PAVEMENT REJUVENATOR AND DRESSING CONDITIONER WITH BLACKENING AGENT

[75] Inventor: Edward W. McGovern, Pittsburgh, Pa.

[73] Assignee: K.A.E. Paving Consultants, Inc., Pittsburgh, Pa.

[21] Appl. No.: 429,578

[22] Filed: Apr. 27, 1995

[51] Int. Cl.[6] .................................................. P32K 35/00
[52] U.S. Cl. ........................... 427/138; 106/232; 106/278; 106/285; 427/140; 427/393.6; 427/258
[58] Field of Search ................................ 427/138, 393.6, 427/140, 258; 106/232, 278, 285

[56] References Cited

U.S. PATENT DOCUMENTS 3,221,615  12/1965  McGovern ............................... 94/23
3,261,269  7/1966   McGovern ............................... 94/23
4,661,378  4/1987   McGovern ............................. 427/138

*Primary Examiner*—Janyce Bell
*Attorney, Agent, or Firm*—Webb Ziesenheim Bruening Logsdon Orkin & Hanson, P.C.

[57] ABSTRACT

A pavement rejuvenating composition in which particular coal tar derivatives and other optional ingredients are admixed with one or more blackening agents. The blackening agent may be one or more of the following: soft coal tar pitch, aromatic cracked petroleum residue, silicone, aliphatic amine, carbon black or 0.01–2.0% by weight pavement dressing conditioner to give the desired blackening and pavement preservation effect.

12 Claims, No Drawings

PAVEMENT REJUVENATOR AND DRESSING CONDITIONER WITH BLACKENING AGENT

FIELD OF THE INVENTION

The invention relates to improvements in pavement rejuvenator and dressing conditioner compositions through the use of blackening agents.

BACKGROUND OF THE INVENTION

At the same time that the paving industry is experiencing the commercial stresses of increasingly strict environmental controls of all kinds, the paved surfaces themselves are experiencing the stresses of greater traffic and larger, heavier vehicles as well as increasing corrosion from the ever-wider use of chemicals for snow and ice removal. The competing demands of new laws and performance standards virtually mandate improvements in paving materials and maintenance methods therefor.

One way to maintain the integrity of paved surfaces is actively to preserve them, so as to avoid the necessity of rebuilding or resurfacing them. A bituminous pavement rejuvenator for such a purpose is disclosed in U.S. Pat. No. 3,221,615, incorporated herein by reference, which is a coal tar derivative composition containing specific ingredients and having particular specifications. Other pavement treating compositions are disclosed in U.S. Pat. Nos. 3,261,269 and 4,661,378, also incorporated herein by reference, which disclose pavement dressing conditioners which contain the above-described bituminous pavement rejuvenator together with additional ingredients and/or solvents. These pavement treating compositions are generally spread or sprayed onto existing pavement surfaces (not only bituminous surfaces but concrete and other surfaces as well) to preserve and to restore the integrity of the pavement.

Even these pavement preserving and restoring compositions, however, do not meet all the needs of the current pavement maintenance industry. For example, pavement restorers often wish to restore the original black color of bituminous pavement which has faded to gray or white. This change of color to black is needed for safety reasons to preserve contrast between painted center and shoulder lines; even intact road markings become faint or invisible when the road surface itself fades to white or gray. It has also been discovered that blacker pavements retain more heat from solar energy, and thus need fewer and less frequent applications of de-icing chemicals than faded roads do. Those who pave and maintain road surfaces, and are thus always mindful of the need to minimize costs and damage associated with de-icing chemicals, therefore also appreciate the need for restoring a dark or black color to paved surfaces of all kinds.

Even beyond these concerns, a ubiquitous goal in restoring old asphalt is inevitably the solving of the "water run-off" problem. The same drying, sun bleaching and oxidation of the asphalt material which originally caused the fading color also invariably causes the asphalt surface to harden, lump and crack. This loss of smooth surface causes rainwater to pool and/or to run in large and sometimes deep gulleys which wreak havoc on traffic and further the degradation of the road. Restoration of the original, smooth, waterproof surface is thus an important consideration in any pavement preservation technique.

Accordingly, a need remains for a treating composition and method for asphalt and other bituminous pavement materials which can simultaneously permanently blacken it and smooth and waterproof it to overcome unwanted water run-off.

SUMMARY OF THE INVENTION

In order to meet this need, the present invention is a pavement rejuvenating composition in which particular coal tar derivatives and other optional ingredients are admixed with one or more blackening agents. The blackening agent may be one or more of the following: soft coal tar pitch, aromatic cracked petroleum residue, silicone, aliphatic amine, carbon black or 0.01–2.0% by weight pavement dressing conditioner (described below) to give the desired blackening and pavement preservation effect.

DETAILED DESCRIPTION OF THE INVENTION

The present invention is a pavement rejuvenating composition in which particular coal tar derivatives and other optional ingredients are admixed with one or more blackening agents. The blackening agent may be one or more of the following: soft coal tar pitch, aromatic cracked petroleum residue (Monsanto PR Resin, Shell 100 or 420, or Sun Monar), silicone, aliphatic amine, carbon black or 0.01–2.0% by weight pavement dressing conditioner (described below) to give the desired blackening and pavement preservation effect.

Pavement rejuvenating and conditioning compositions are disclosed in U.S. Pat. Nos. 3,221,615, 3,261,269 and 4,661,378 (now Reexamination Certificate 4,661,378) incorporated herein by reference. It is helpful in the context of this specification, however, to provide the following summary of these rejuvenating and conditioning compositions, so as to make the claimed invention more clear.

The bituminous pavement rejuvenator disclosed in U.S. Pat. No. 3,221,615 is a coal tar derivative containing a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield viscosity at 25° C. of 30 cps, and an initial boiling point of at least 180° C. and a continuous boiling range to at least 300° C., 70–40% by volume of the material remaining as residue at 300° C. (together with additional specifications). The rejuvenator is disclosed as at least primarily intended to rejuvenate bituminous pavement, namely, asphalt roads. The patent identifies the ability of the composition to plasticize the binder of the bituminous pavement as the assumed basis for its utility, and states that "[i]t has been found that the paving treated in accordance with this invention exhibits characteristics similar to those of a new pavement" and that "the pavement regains its ability to heal cracks under traffic and previously curled surfaces flatten under traffic," or in other words "regains its cold flow properties." The composition is handled in the same manner as previously existing liquid bituminous materials, and is heated and sprayed onto the pavement surface to be treated in the amount of about 0.05 to 0.5 gallons per square yard surface.

The above-described bituminous pavement rejuvenator is itself an ingredient in the pavement dressing conditioner described in U.S. Pat. No. 3,261,269. The pavement dressing conditioner can be applied to asphalt, concrete and other paved surfaces and contains "road tar" and coal tar solvent in addition to bituminous pavement rejuvenator. When used to treat paved surfaces, this admixture is believed to restore the resilience of pavement which has otherwise started to harden and to crack, so as to prevent further cracking and even to restore the ability for self-healing of cracks to the existing pavement.

The pavement dressing conditioner described in Reexamination Certificate No. 4,661,378 is very similar to the pavement dressing conditioner disclosed in the '269 patent, except that it also includes a specialized solvent.

Both pavement dressing conditioners and the bituminous pavement rejuvenator described above may be enhanced by the addition of blackening agents according to the present invention. It should be noted, however, that generally it is the bituminous pavement rejuvenator (BPR) to which the blackening agent is added, even if that blackened BPR is then used as a constituent of a pavement dressing conditioner (PDC) incorporating the blackened BPR. It should also be noted that ordinary PDC itself, in small amounts, can serve as the blackening agent additive to the BPR, even though (unblackened) BPR is an ingredient of (unblackened) PDC. The reason for this is that PDC contains "road tar" and is thus inherently blacker than its constituent BPR for this reason.

The blackening agent should be incorporated into the BPR (or into the PDC) in the amount of about 0.01 to 15% by weight, except that when PDC is used as the blackening agent about 0.01–2.0% by weight should be incorporated. The blackening agent may also be one or more of the following: soft coal tar pitch, silicone, aliphatic amine, or carbon black such as the various commercially available lampblack compositions. It should be borne in mind that the black color of all these materials is relative, so that when (unmodified) PDC is used as the blackening agent to blacken a quantity of BPR, and the blackened BPR is used as an ingredient in a new batch of PDC, the resulting PDC will have a darker black color than the (unmodified) PDC used as the blackening agent in the first instance. While this is somewhat complicated, it is all consistent with the overriding goal of the invention—to add blackening agent to BPR and/or PDC so as to impart long-lasting restored black color to bituminous pavements treated therewith, and to increase the wear- and water-run-off-resistance of the treated surfaces.

Mixed blackening agents may also be used. For example, a preferred blackening component may be made up of five parts lampblack, 1–3 parts fatty acid amine and up to about one-half part silicone (polyorganosiloxane polymer). Other mixtures of the disclosed blackening agents are also contemplated, in varying amounts.

In practice, the blackening agent additive need merely be mixed with the BPR and/or PDC, in a suitable vessel and/or with suitable mixing equipment, at moderately elevated temperatures. Generally, BPR should be admixed at a temperature of about 150°–250° F., whereas PDC should be heated only to maximum 150° F. The blackened compositions are applied in the same way as are ordinary BPR and/or PDC compositions, that is, they are usually sprayed on existing pavement to impregnate them before the compositions cure. When traffic is to proceed immediately over the pavement, it is desirable to sprinkle the pavement with sand (black sand is preferred) so as to minimize pick-up of the composition(s) by vehicle tires. If traffic is not heavy, it is advantageous to roll the pavement at the end of seven days with a rubber tired roller. This speeds the restoration of the flexibility and cold flow properties when the pavement is asphalt, so that it behaves in the manner of new paving materials. In the event light colored sand has been used, rolling also incorporates this light sand into the pavement and helps in the restoration of the desired black color.

The following examples are illustrative, and not intended to be limiting.

EXAMPLE 1

About 90 parts by weight of bituminous pavement rejuvenator prepared according to U.S. Pat. No. 3,221,615 was placed in a stainless steel mixing tank fitted with a mixing impeller. To the tank were added about 5 parts by weight of a commercially available lampblack composition sold under the tradename Columbia Carbon Lampblack, about 3 parts by weight of Redicote 2323 fatty acid amine, and about one-half part silicone (polyorganosiloxane). Other lampblack compositions are Monsanto Lampblack No. 10 and Harshaw Blue Tone, which could have been substituted, as well as other lampblack materials known in the art.

EXAMPLE 2

Topped coke oven tar (75–100 seconds Float Test at 50° C., 47.4% by weight) at a temperature of 180° F. was added to a mixing tank equipped with a three-bladed impeller, and 5% by weight lampblack was added thereto with mixing. To the tank were added, at ambient temperature, 11.6% by weight of B-T-X solvent and 20% by weight of crude heavy solvent naphtha (containing 50% resinifiable coumarone-indene resin). The mixture was stirred at 60 r.p.m. for 15 minutes and then 16.0% by weight of bituminous pavement rejuvenator (according to U.S. Pat. No. 3,221,615) at a temperature of 150° F. was added. The mixture was stirred for an additional 120 minutes in order to mix the ingredients thoroughly. The resulting pavement dressing conditioner containing blackening agent was then transferred to a storage tank at ambient temperature, for storage prior to use.

EXAMPLE 3

The composition according to Example 2 was further blended with about 30% by weight of an aromatic solvent sold under the tradename Hi-Sol 10 and having the following specifications: API Gravity @60° F. of from 11–30, Specific Gravity @60/60° F. of from 0.876–0.993, Distillation Range °F. of from 310–450 IBP (initial boiling point, ASTM: D86-62), to 350–550 DP (dry point, ASTM: D86-62) and a flash point °F. TCC of from 110–250.

EXAMPLE 4

Example 1 was repeated several more times, using the following ingredients and proportions (all percentages are by weight):

95.0–99.0% BPR, 1.0–10.0% coal tar pitch (float test 50–300 seconds @50° C.), 0.001–0.05 silicone and 0–5.0% aromatic solvents;

80.0–98.0% BPR, 2.0–20.0% PDC, 0.001–0.05% silicone;

87.0–98.0% BPR, 2.0–10.0% coal tar pitch, 0.05–3.0% amine, and 0.001–0.05% silicone;

77.0–98.0% BPR, 2.0–20.0% PDC, 0.05–3.0% amine, and 0.001–0.05% silicone; and 92.0–99.0% BPR, 0.001–0.05% silicone, 0.05–3.0% amine, and 0.01–5.0 carbon black (lampblack).

All of the compositions, when applied to faded asphalt pavement, restored the black color of the pavement and gave good penetration and restoration of waterproofing and cold flow properties.

Although the above description and examples are illustrative of the present subject matter, the invention is only to be limited insofar as is set forth in the accompanying claims.

What is claimed is:

1. A pavement treating composition comprising a quantity of bituminous pavement rejuvenator consisting essentially of a coal tar derivative containing a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield viscosity at 25° C. of 30 cps, and an initial boiling point of at least 180° C. and a continuous boiling range to at least 300° C., with 70–40% by volume of said mixture remaining as residue when said mixture is boiled at 300° C., in admixture with a quantity of a blackening agent, wherein the composition contains about 77–99 weight % bituminous pavement rejuvenator.

2. The composition according to claim 1 wherein said blackening agent is one or more of the compositions selected from the group consisting of soft coal tar pitch, aromatic cracked petroleum residue, pavement dressing conditioner comprising said bituminous pavement rejuvenator and tar, elemental carbon, lampblack and aromatic cracked petroleum residue.

3. The composition according to claim 2 further comprising an additive selected from the group consisting of aliphatic amine, aliphatic fatty acid amine and silicone.

4. The composition according to claim 1 consisting essentially of: 90.0–99.0% of said bituminous pavement rejuvenator, 1.0–10.0% coal tar pitch (float test 50–300 seconds @50° C.), 0.001–0.05 silicone and 0–5.0% aromatic solvents.

5. The composition according to claim 1 consisting essentially of: 80.0–98.0% of said bituminous pavement rejuvenator, 2.0–20.0% pavement dressing conditioner comprising bituminous pavement rejuvenator and tar and 0.001–0.05% silicone.

6. The composition according to claim 1 consisting essentially of: 87.0–98.0% of said bituminous pavement rejuvenator, 2.0–10.0% coal tar pitch, 0.05–3.0% amine, and 0.001–0.05% silicone.

7. The composition according to claim 1 consisting essentially of: 77.0–98.0% of said bituminous pavement rejuvenator, 2.0–20.0% pavement dressing conditioner comprising said bituminous pavement rejuvenator and tar, 0.05–3.0% amine and 0.001–0.05% silicone.

8. The composition according to claim 1 consisting essentially of: 92.0–99.0% bituminous pavement rejuvenator, 0.001–0.05% silicone, 0.05–3.0% amine, and 0.01–5.0% carbon black.

9. A method for blackening pavement, comprising:

admixing a blackening agent into a composition containing a bituminous pavement rejuvenator, said bituminous pavement rejuvenator consisting essentially of a coal tar derivative containing a mixture of di-, tri- and tetracyclic aromatic compounds and their alkyl homologs containing lower alkyl groups together with a significant amount of phenolic and hydroxy derivatives, said mixture having a specific gravity at 25/25° C. of at least 1.08, a maximum Brookfield viscosity at 25° C. of 30 cpS, and an initial boiling point of at least 180° C. and a continuous boiling range to at least 300° C., with 70–40% by volume of said mixture remaining as residue when said mixture is boiled at 300° C.; and applying the resulting composition to the pavement to be treated, wherein the composition contains about 77–99 weight % of said bituminous pavement rejuvenator.

10. The method according to claim 9 wherein said blackening agent is at least one agent selected from the group consisting of soft coal tar pitch, aromatic cracked petroleum residue, pavement dressing conditioner, elemental carbon, lampblack and aromatic cracked petroleum residue.

11. The method according to claim 10 wherein said blackening agent is a mixture of lampblack, fatty acid amine and silicone.

12. The method according to claim 10 wherein said step of admixing a blackening agent into a composition containing a bituminous pavement rejuvenator further comprises admixing an additive into said composition wherein said additive is selected from the group consisting of aliphatic amine, aliphatic fatty acid amine and silicone.

\* \* \* \* \*